(12) United States Patent
Fankhauser et al.

(10) Patent No.: US 7,726,923 B2
(45) Date of Patent: Jun. 1, 2010

(54) ANCHOR BAR WITH A SUPPORT BLOCK

(75) Inventors: Urs Fankhauser, Wil (CH); Bruno Bertola, Zürich (CH)

(73) Assignee: Ed. Geistlich & Söhne AG (CH)

( * ) Notice: Subject to any disclaimer, the term of this patent is extended or adjusted under 35 U.S.C. 154(b) by 0 days.

(21) Appl. No.: 10/536,343

(22) PCT Filed: Nov. 18, 2003

(86) PCT No.: PCT/CH03/00762

§ 371 (c)(1),
(2), (4) Date: May 25, 2005

(87) PCT Pub. No.: WO2004/048718

PCT Pub. Date: Jun. 10, 2004

(65) Prior Publication Data

US 2006/0013668 A1  Jan. 19, 2006

(30) Foreign Application Priority Data

Nov. 25, 2002  (CH) .................................... 1978/02

(51) Int. Cl.
- F16B 39/02 (2006.01)
- F16B 1/00 (2006.01)
- E04B 1/38 (2006.01)
- E21D 20/00 (2006.01)

(52) U.S. Cl. ........................ 411/82; 411/930; 411/82.1; 411/82.2; 52/704; 405/259.5

(58) Field of Classification Search .......... 411/82–82.3, 411/930
See application file for complete search history.

(56) References Cited

U.S. PATENT DOCUMENTS

| | | | | |
|---|---|---|---|---|
| 115,587 A | * | 6/1871 | Dorn ........................... | 408/190 |
| 1,379,209 A | * | 5/1921 | Phillips ........................ | 411/29 |
| 1,465,870 A | * | 8/1923 | Sanders ....................... | 408/213 |
| 1,955,768 A | * | 4/1934 | Powell ......................... | 175/388 |
| 3,227,012 A | * | 1/1966 | Lemelson ..................... | 408/67 |
| 3,735,541 A | * | 5/1973 | Vanderlinde ................... | 52/98 |
| 4,098,166 A | * | 7/1978 | Lang ........................... | 411/23 |
| 4,101,238 A | * | 7/1978 | Reibetanz et al. ............. | 408/59 |
| 4,211,049 A | * | 7/1980 | Fischer ........................ | 52/704 |
| 4,386,882 A | * | 6/1983 | Bereiter ..................... | 411/387.1 |

(Continued)

FOREIGN PATENT DOCUMENTS

DE   36 34 266 A1   4/1988

(Continued)

*Primary Examiner*—Victor Batson
*Assistant Examiner*—David Reese
(74) *Attorney, Agent, or Firm*—Lerner, David, Littenberg, Krumholz & Mentlik, LLP

(57) ABSTRACT

A post anchor for anchoring a member to a post is disclosed. The post anchor comprises two segments: a drill end and a second end. The drill end is adapted to drill a hole in a post. A member is anchored to the post by attaching the member to the second end of the post anchor. The drill end is adapted to drill a hole in a post so that the post anchor is arranged in the hole without any axial play. An adhesive may be added to the hole to fill the spaces between the post and the drill end.

4 Claims, 1 Drawing Sheet

U.S. PATENT DOCUMENTS

| | | | | |
|---|---|---|---|---|
| 4,393,638 | A * | 7/1983 | Sell et al. | 52/704 |
| 4,973,210 | A * | 11/1990 | Osborne et al. | 411/389 |
| 5,049,015 | A * | 9/1991 | Sawaide et al. | 411/82.1 |
| 5,328,300 | A * | 7/1994 | Fischer et al. | 405/259.6 |
| 5,531,553 | A * | 7/1996 | Bickford | 411/389 |
| 5,820,319 | A * | 10/1998 | Hull et al. | 408/214 |
| 6,048,141 | A * | 4/2000 | Freeman | 408/201 |
| 6,065,909 | A * | 5/2000 | Cook | 408/206 |
| 6,240,696 | B1 * | 6/2001 | Ludwig et al. | 52/698 |
| 6,367,205 | B2 * | 4/2002 | Cornett, Sr. | 52/23 |
| 6,514,013 | B2 * | 2/2003 | Li et al. | 405/259.5 |
| 6,698,980 | B2 * | 3/2004 | Mongrain | 405/259.5 |
| 6,896,462 | B2 * | 5/2005 | Stevenson et al. | 411/82 |
| 2001/0009638 | A1 | 7/2001 | Crawford et al. | |

FOREIGN PATENT DOCUMENTS

| | | |
|---|---|---|
| DE | 199 12 815 A1 | 10/2000 |
| WO | WO-99/07956 A1 | 2/1999 |

\* cited by examiner

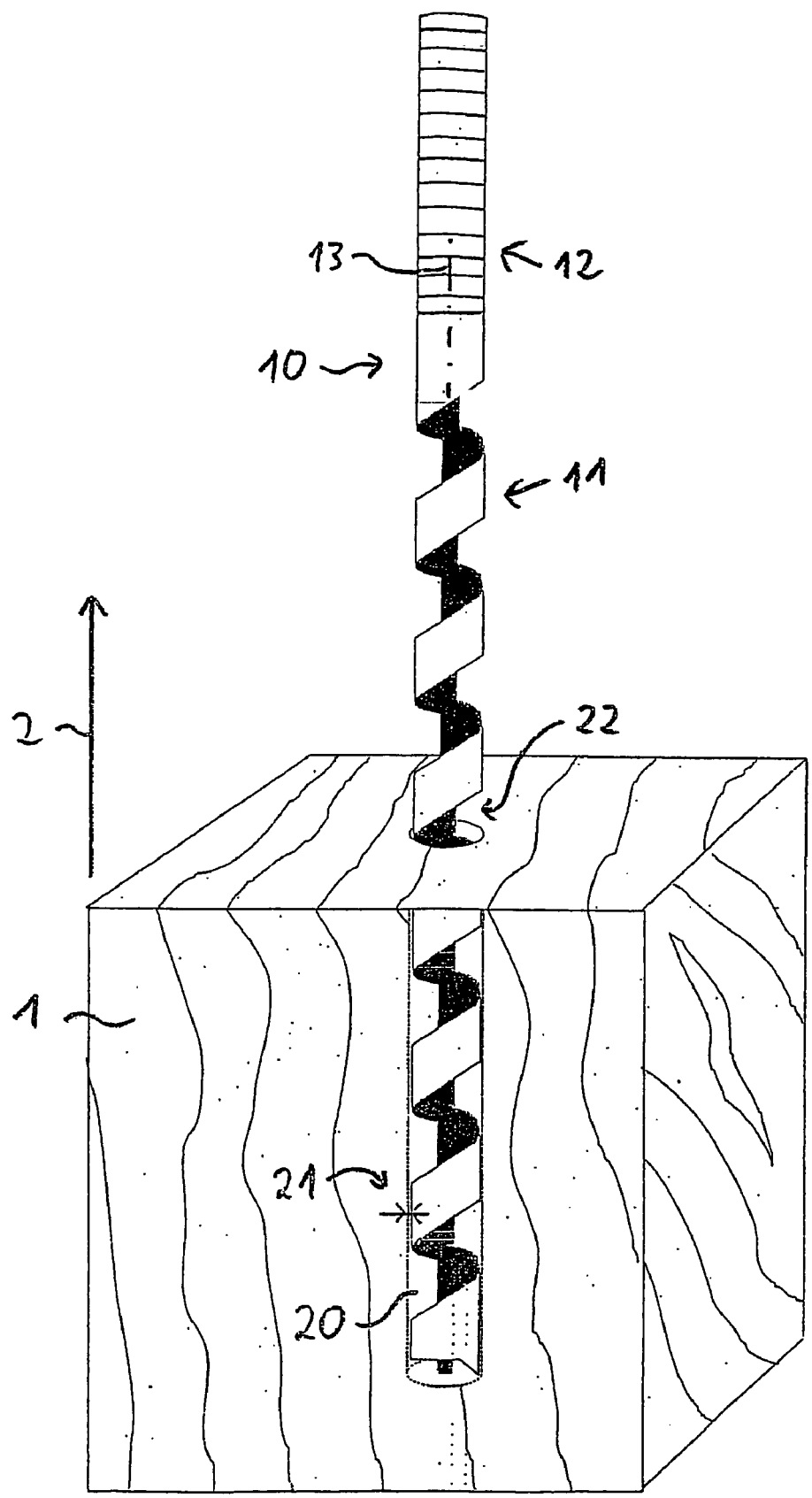

ANCHOR BAR WITH A SUPPORT BLOCK

CROSS REFERENCE TO RELATED APPLICATIONS

This application is a National Phase Entry under §371 of International Application No. PCT/CH2003/00762, filed Nov. 18, 2003, which in turn claims the benefit of Swiss Patent Application No. 1978/02, filed Nov. 25, 2002.

FIELD OF THE INVENTION

The invention relates to a post with a post anchor and a method to produce such a post.

BACKGROUND OF THE INVENTION

Post anchors are known in the prior art, for example from German Patent DE 36 34 266. In that document, a screw-in threaded rod is adhesively bonded in a corresponding drill-hole in a post, a longitudinal groove being provided on the threaded rod so that the glue can accordingly be allowed to enter the drillhole between the threaded rod and the wall of the drillhole.

Another post anchor is shown in German Patent DE 199 12 815, in which a threaded spike is provided on a plate which can be placed against the underside of a post, this threaded spike penetrating the post during positioning of the post anchor. Provided on the opposite side of the post anchor is a sleeve with an internal thread so that an anchor bar can be subsequently screwed in outside of the post.

In all the posts disclosed in the prior art, even when the threaded rods are glued in, there is a problem in terms of the parallelism of the post anchor and post. This means that the post anchor does not usually have its center axis lying exactly parallel to the longitudinal axis of the post. This is an unwanted property of such a system and a disadvantage when assembling such post anchor systems on building sites.

In practice, the threaded rod and post of the present invention is therefore not, as in DE 199 12 815, put together on the building site. Instead, this takes place beforehand so that said parallelism can be achieved to the greatest possible degree under industrial production conditions.

Moreover, the connection of metal anchors in wooden posts usually leaves something to be desired in terms of the force required to extract the anchors, for example.

SUMMARY OF THE INVENTION

The present invention provides a post anchor of the type mentioned in the beginning which has better parallelism and in which the fixing is, moreover, better secured against twisting.

In one embodiment, the present invention comprises a post anchor comprising a drill bit end and a second end adapted to be connected to a member wherein the drill bit end is adapted to drill a hole in a post with substantially no radial play. The drill bit end may be an auger bit, which may have a diameter of between 5 and 18 millimeters. The total length of the post anchor may be between 10 and 100 centimeters. The drill bit end may make up half of the post anchor. The second end of the post anchor may be threaded. The post may be made of wood, plastic, or any other material suitable for a post. The cross section of the post may be square, rectangular, elliptical, or round.

In another embodiment, the present invention comprises a method of affixing a post anchor to a post, comprising drilling a hole in the post using the post anchor as a drill and introducing an adhesive into the hole with the post anchor inserted. The post anchor may also be rotated counterclockwise a certain amount, such as one-eighth or one-sixteenth of a turn, before the adhesive is introduced. The hole is preferably drilled in the center of the post, but may be drilled elsewhere in the post.

DETAILED DESCRIPTION OF A PREFERRED EMBODIMENT

The invention will now be described in more detail with the aid of an exemplary embodiment with reference to FIG. 1. The single drawing shows a partly sectioned perspective view of a post together with an inserted post entrance.

The reference number 1 is used to denote a post. The post 1 is made of wood and has a square cross section. Of course, the cross section may also be shaped differently, being for example round or elliptical, rectangular or polygonal. The material of the post 1 may also be chosen from another material only if these materials are similar to wood within the context given below. The similarity in question is in particular important for plastic materials.

Said post 1 has a longitudinal axis whose orientation here is indicated by the arrow 2 running parallel to it. The post 1 can be fastened on a wall or floor surface (not shown in the FIGURE) with the aid of a post anchor (anchor 10 for short) according to the invention. The FIGURE shows one moment during the production of the connection between anchor 10 and post 1 when the anchor 10 has not yet been fully sunk in the post 1.

The anchor 10 is preferably constructed in one piece and as such comprises at least two different regions 11 and 12. The first region 11 is made up of an auger bit, this region 11 being intended to be set into the post 1. The second region 12 can be designed according to the particular application of the post anchor; in particular it may thus be a threaded rod section. This threaded rod section 12, either by itself or by way of a further section (not shown in the drawing), can be positively connected to a drive, for example a drilling machine, to enable the auger bit 11 to be driven into the post 1.

The FIGURE shows, in dotted form, the outlines of a drillhole 20 in which the auger bit section 11 has already been advanced more than halfway. Instead of using an auger bit which allows chips cut out of the post to be lifted out, use may also be made of any other drill bit which makes possible the production of a stress-free bore, in particular in wood, in which there is no radial play. Radial play here is to be understood as meaning the distance 21 between the outside of the drill bit 11 and the inner wall of the bore 20.

The auger bit 11 extracts chips from the drillhole 20 and at the same time creates a certain free space in the axial direction, i.e. along the longitudinal axis 13 of the anchor 10, into which free space an adhesive can be passed in through the upper opening 22 of the bore 20 once the drill bit section 11 has been fully inserted. Particularly advantageous adhesives are epoxy resin-based adhesives and polyurethanes. Before the adhesive is introduced, the anchor 10 may preferably be rotated back by an eight to a half of a rotation in order to make it easier to pass in the adhesive. Alternatively, it may be completely withdrawn, the adhesive poured in and the drill bit reinserted.

The drill bit according to the invention ensures axially correct fitting, allowing the anchor 10 to be well centered in the post 1. The prior art according to DE 199 12 815 employing the spike results in a displacement of the material of the post 1 and thus in stresses therein. The auger bit 10 produces a stress-free bore in wood and other comparable materials.

The length of the anchor 10 depends on its field of application. For a post 1 having a diameter or cross-sectional dimensions of from 5 to 10 centimeters, given a diameter of the auger bit 11 of between 6 and 10 millimeters, a customary total length of the anchor may be between 10 and 70 centimeters. Preferably, this length is divided in half between the drill bit part 11 and the threaded rod part 12. Of course, it is also possible for the threaded rod 12 or the auger bit 11 to be shorter or longer than the respective other section. It is also possible to provide a connection element (not shown in the drawing) between the auger bit 11 and the threaded rod 12 (or a flat rod without a thread). This may be an outer hexagonal section or a disc which is oriented radially with respect to the longitudinal axis.

The anchor 10 according to this invention provides a simple, very secure anchor device which is able to be centered and which is correctly aligned axially, this anchor device being driven into the post beforehand within a storage area or during the production of said post. Alternatively, the post anchor may be set into the posts provided on a building site once on site.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method of introducing a post anchor into a post, the method comprising:

provinding a post and a post anchor, wherein the post comprises an elongated block defined by a top surface, a bottom surface, at least one side surface between the top surface and the bottom surface, and a longitudinal axis extending between the top surface and the bottom surface, wherein the post anchor comprises a first section which includes a self-drilling drill bit section adapted to form a drill hole, the self-drilling drill bit section having an outer surface and defining at least one helical groove, the helical groove extending into the drill bit section and configured to aid in removal from the drill hole of chips or material cut during the drilling process, the drill hole having a surface and a second section for fastening to an element, wherein the diameter of the drill bit section is substantially the same as the diameter of the surface of the drill hole, wherein the post anchor is flangeless, and wherein the drill bit section is arranged within the post, the second section extending over the top surface of and away from the post;

forming a drillhole in the post with the drill bit section, wherein the drillhole extends from and through the top surface and along the longitudinal axis, and wherein the outer surface of the drill bit section is substantially in contact with the surface of the drillhole; and introducing adhesive into the drillhole with the drill bit section inserted so as to take up, by filling, any remaining radial play and axial play of the drill bit section in the drillhole, and wherein the helical groove is at least partially filled with an adhesive after the drill hole is formed.

2. The method as claimed in claim 1, wherein, prior to introducing the adhesive, the post anchor is rotated back by an eighth to a half of a rotation.

3. The method as claimed in claim 1, wherein the drill bit section is substantially in contact with the surface of the drill hole over substantially the length of the drillhole.

4. The method as claimed in claim 1, wherein the diameter of the first section of the post anchor is substantially the same as the diameter of the second section of the post anchor.

* * * * *